UNITED STATES PATENT OFFICE.

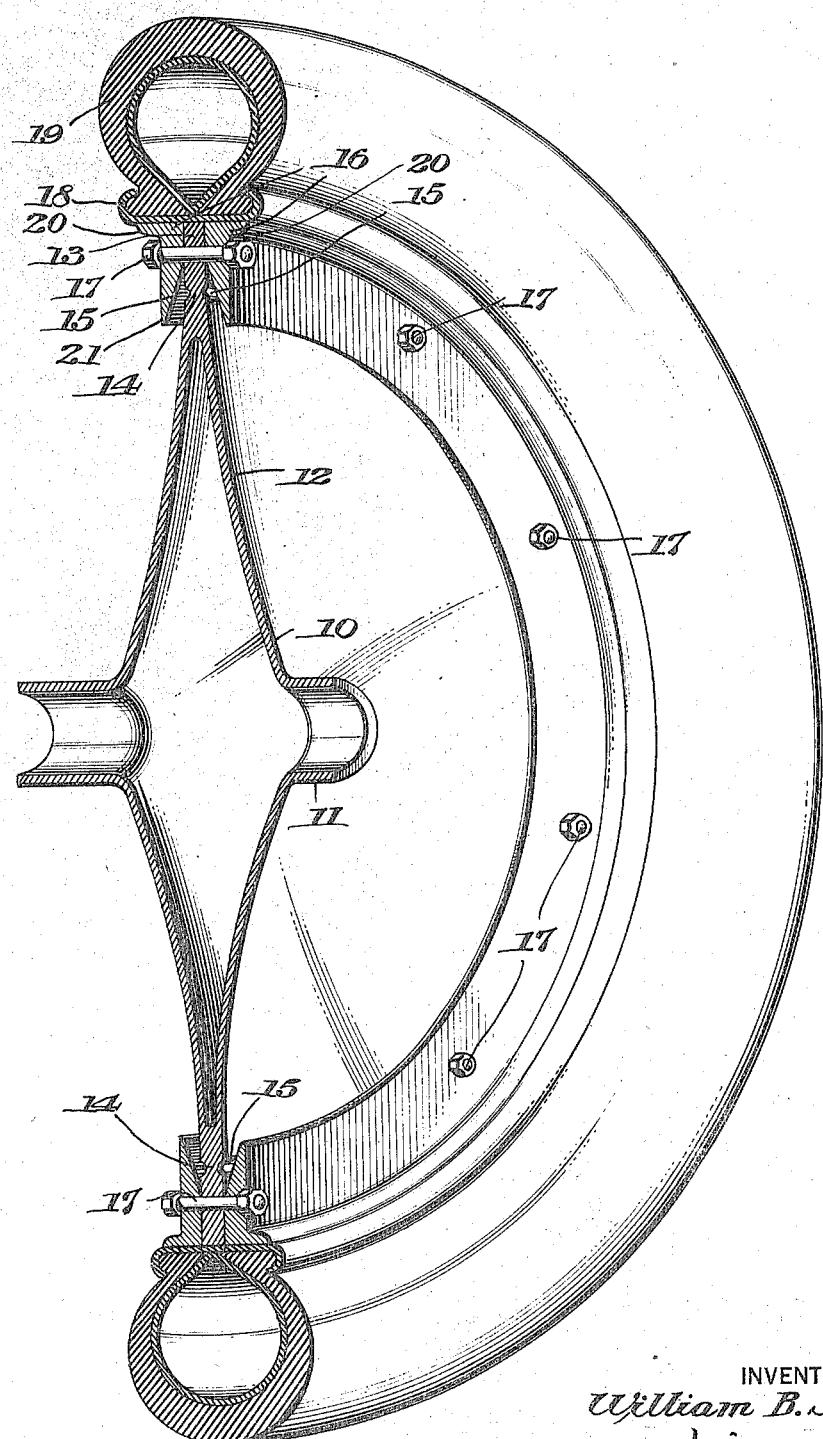

WILLIAM B. STOUT, OF DETROIT, MICHIGAN, ASSIGNOR TO PACKARD MOTOR CAR COMPANY, OF DETROIT, MICHIGAN, A CORPORATION OF MICHIGAN.

WHEEL.

1,315,050.               Specification of Letters Patent.        Patented Sept. 2, 1919.

Application filed November 28, 1917. Serial No. 204,387.

*To all whom it may concern:*

Be it known that I, WILLIAM B. STOUT, a citizen of the United States, and resident of Detroit, Wayne county, State of Michigan, have invented certain new and useful Improvements in Wheels, of which the following is a specification.

This invention relates to wheels and it is shown as particularly adapted to metal disk wheels.

In automobile use, when a wheel breaks one corner of the car drops down on the ground and usually a serious accident results. It is one of the objects of the present invention to produce a wheel in which the weakest part is so located that should the wheel break at that point the part of the wheel beyond that point will be caught by the inner part of the wheel and retained thereon so that the car will not drop to any appreciable extent.

Another object of the invention is to provide a wheel with its weakest part adjacent its periphery together with means for catching the outer part of the wheel by the inner part in case of breakage at the weakened part.

Other objects of the invention will appear from the following description taken in connection with the drawing which forms a part of this specification, and in which the figure represents a perspective and sectional view of a wheel made in accordance with this invention.

Referring to the drawing, 10 represents a metal disk wheel having hub parts 11 and disk parts 12 which meet at their periphery in the form of a single rim part 13. The part of the wheel so far described may be built up in any suitable way, as by casting or by welding or riveting the several parts together.

Near its periphery the wheel is formed with a weakened part 14, this in the form shown being accomplished by one or more circular grooves 15 machined or otherwise made in the wheel. Thus the weakest part of the wheel is a known factor and it is located adjacent the periphery so that the portion of the wheel inside of the part 14 may form a complete disk to catch and carry the outer part in case of breakage, as will hereafter more fully appear.

Two rim parts 16 are secured to the outer part 13 of the wheel as by bolts 17, and these rim parts form a support for the rim 18 upon which the tire 19 is mounted. The rim 18 may be secured to the rim parts 16 in any approved way, and if desirable the rim part 16 may have flanges 20 extending outwardly slightly to grip the rim 18 and hold it in place. The rim 18 may then be removed by removing one of the rim parts 16. The means whereby the outer part of the wheel is caught by the inner part in case of breakage at the weakened part 14, comprises the two inwardly extended rings or flanges 21 which are shown as separated from each other and from the inner part 14. As illustrated these flanges 21 are formed integral with the rim parts 16, extending radially inward from the main body portions of those parts. It will be seen that the inward extension of the flanges 21 is beyond the weakened part 14 so that in case of breakage of the wheel at the weakened part 14 the inner part of the wheel will catch between the flanges 21 and its periphery will run in the groove or channel formed by the flanges until the vehicle can be brought to a standstill. Of course the dropping of the axle will be very slight due to the close proximity of the flanges 21 to the part 14 of the wheel.

It will be understood that other forms of the invention may be made without departing from the spirit or scope hereof.

Having thus described my invention, what I claim and desire to secure by Letters Patent is:—

1. A wheel having a structural element adjacent the periphery of the wheel weakened in a part thereof and having flanges from the rim extending inwardly beyond said weakened part.

2. A wheel having a structural element which is adjacent the periphery of the wheel provided with a part weakened below the strength of the remaining structure of said element, said wheel having flanges from the rim extending inwardly beyond said weakened part and on both sides thereof.

3. A wheel having a circular structural element adjacent the periphery of the wheel, said element having a part thereof weakened with respect to the remaining structure of the element, a rim, and separated side flanges extending inwardly beyond said weakened part of said element and diverging from the body of the wheel.

4. A wheel of disk form having rim parts attached to its periphery, the disk part of said wheel being weakened just inwardly of the points of attachment of said rim parts, and said rim parts having flanges extending inwardly beyond the weakened part of the disk part.

5. A wheel of disk form having rim parts attached to its periphery, the disk part of said wheel being weakened just inwardly of the points of attachment of said rim parts, and said rim parts having flanges extending inwardly beyond the weakened part of the disk part and at both sides thereof.

6. A metal wheel having circular weakening grooves formed near its periphery, and rim parts secured to the wheel radially outward of said grooves and having parts extending radially inwardly of and at both sides of said grooves.

7. A metal wheel having circular weakening grooves formed near its periphery, and rim parts secured to the wheel radially outward of said grooves and having parts extending radially inwardly of and out of contact with the wheel at said grooves.

8. A wheel having a circular part weakened below the strength of the remaining structure thereof and means connected to the wheel beyond the line of said weakened part for catching the outer part of the wheel by the inner part in case of breakage at the weakened part.

In testimony whereof I affix my signature.

WILLIAM B. STOUT.